United States Patent [19]
Laurent et al.

[11] Patent Number: 5,492,669
[45] Date of Patent: Feb. 20, 1996

[54] TIRE MOLD AND METHOD OF MOLDING THE TIRE

[75] Inventors: Daniel Laurent, Meylan; Jean-Pierre Ladouce, Clermont-Ferrand, both of France

[73] Assignee: Sedepro, Paris, France

[21] Appl. No.: 364,517

[22] Filed: Dec. 27, 1994

Related U.S. Application Data

[63] Continuation of Ser. No. 59,891, May 10, 1993, abandoned.

[30]   Foreign Application Priority Data

May 13, 1992 [FR] France ................... 92 05903
Dec. 24, 1992 [FR] France ................... 92 15818

[51] Int. Cl.⁶ ........................................ B29C 35/02
[52] U.S. Cl. .................. 264/326; 264/315; 425/39; 425/47
[58] Field of Search ................. 264/36, 315, 326; 425/39, 46, 47

[56]             References Cited

U.S. PATENT DOCUMENTS 3,704,082  11/1972  Hottle ........................... 425/46
3,779,677  12/1973  Greenwood .
3,847,520  11/1974  Plumhans ....................... 425/39
3,999,907  12/1976  Pappas .
4,691,431   8/1987  Hayata .
4,895,692   1/1990  Laurent et al. .
4,931,004   5/1990  Fogarasi et al. .

FOREIGN PATENT DOCUMENTS 451832  10/1991  European Pat. Off. .......... 425/39

Primary Examiner—Mathieu D. Vargot
Attorney, Agent, or Firm—Brumbaugh, Graves, Donohue & Raymond

[57]              ABSTRACT

The peripheral ring of a sector mold for tires is formed of an assembly of plates 1 resting against each other and stacked in such a manner as to push each other back. The ring therefore has a continuous tendency to increase in diameter. This tendency is resisted, for instance, by a conical hoop which simultaneously pushes all the plates 1 radially in the molding direction.

27 Claims, 2 Drawing Sheets

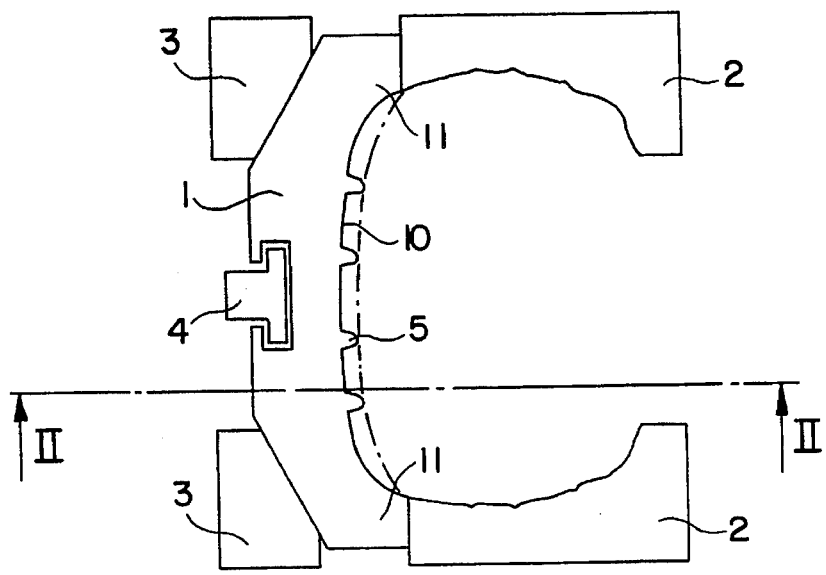
FIG. 1
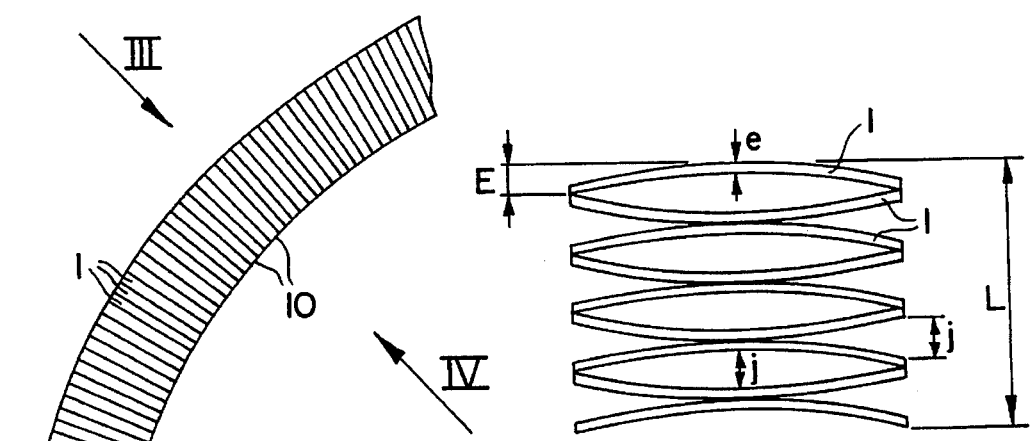
FIG. 2
FIG. 3
FIG. 4

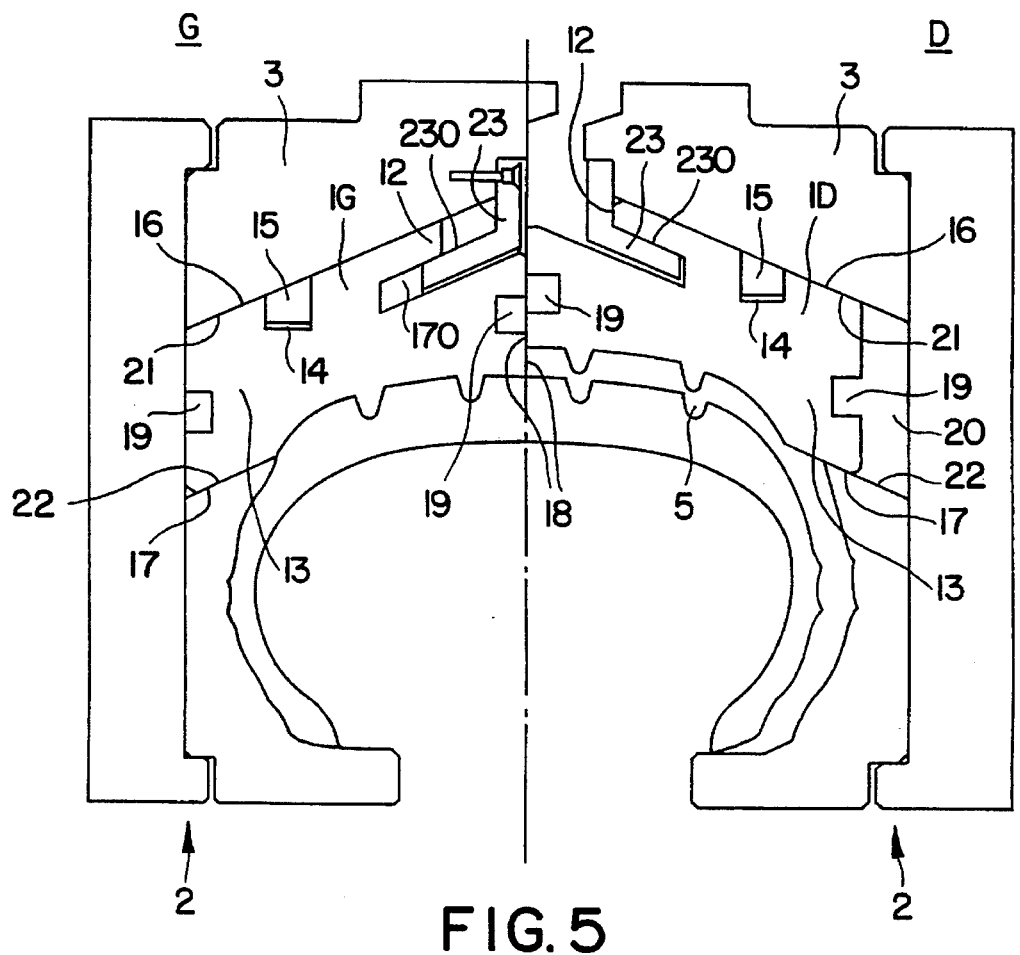
FIG. 5
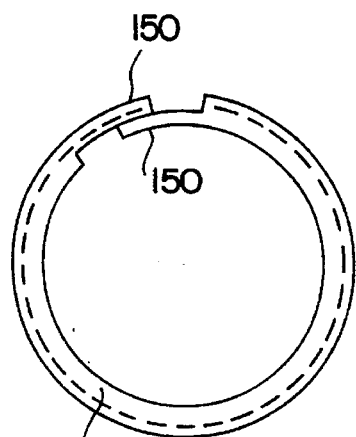
FIG. 6
FIG. 7
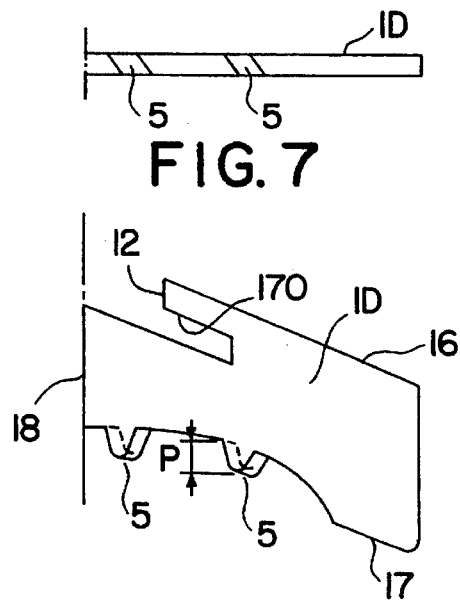
FIG. 8

TIRE MOLD AND METHOD OF MOLDING THE TIRE

This application is a continuation of application Ser. No. 08/059,891, filed on May 10, 1993, now abandoned.

BACKGROUND OF THE INVENTION

The molding of tires, in particular the tread of tires, must satisfy a number of restrictive conditions.

One of these conditions concerns the stripping of the tread sculpturing from the mold, which must impose as little stress as possible on the tire, under the penalty otherwise of causing disturbances, particularly in the reinforcement architecture of the tire. This leads to the preference of so-called "sector" molds, illustrated, for instance, by the disclosure in U.S. Pat. No. 3,779,677, rather than so-called "two part" molds (see U.S. Pat. No. 2,874,405).

Furthermore, it is desirable that, particularly at the level of the tread, there is no burr due to rubber which has been able to flow between two molding elements, for instance between two sectors. For this reason, as a general rule the mold is closed (all sectors adjoining each other) before imposing additional shaping on the raw tire by increase of the pressure prevailing in the vulcanization membrane, which causes the rubber of the tread to penetrate into the elements which mold the tread pattern.

EP Patent Application 0 242 840 describes a completely rigid mold having a peripheral ring of sectors in order to mold the tread, two lateral shells to mold the side walls (outer surfaces of the tire), and a rigid core to mold the inner surface of the tire. The completely rigid design of this mold results in numerous advantages as to the quality of the molded tire since the geometrical shapes obtained are of high quality (excellent circularity in every transverse position). However, the volume molding imposed makes it necessary to satisfy very close tolerances with regard to the volume of the raw blank of the tire.

SUMMARY OF THE PRESENT INVENTION

One object of the invention is to retain the advantage of the rigid mold from the standpoint of respect of and perfect control of the geometrical quality of the tires made with this type of mold, while making the molding operation less sensitive to the fluctuations in volume of the raw blanks of the tires to be molded and vulcanized.

Simplification of the kinematics for the opening and closing of the molds, and therefore the simplification of the vulcanization presses, constitutes another object of the invention.

The mold of the present invention not only makes it possible to achieve these objectives but also results in a general improvement in the molding and stripping from the mold of the tires, whether or not use is made of a rigid core in order to mold the inner cavity of the tire.

The mold of the present invention, which comprises two shells for the molding of the outside of the side walls and a peripheral ring for the molding of the outside of the tread, is characterized by the fact that the said ring is formed by a stacking in circumferential direction of a plurality of adjacent elements of slight thickness which are substantially radially oriented.

In accordance with another aspect of the invention, means are provided which authorize a movement of the elements which permits said ring to increase in diameter, and means for controlling the movement of the elements. The respective circumferential position of each element remains unchanged. Preferably, it is the elements themselves which, due to the shape which is given them, comprise means which permit said ring to increase in diameter; each element bears against the two adjacent elements so as to assure a sort of elastic repulsion of the elements with respect to each other in circumferential direction.

In this way, the bearing pressures of said elements against each other, that is to say the circumferentially oriented bearing pressures, continuously tend to move the elements away from each other. This movement apart can only be accompanied by a radial backward movement of said elements, which can be made possible and controlled as will be explained in detail below. Thus the mold acts in less rigid manner.

BRIEF DESCRIPTION OF THE DRAWINGS

The following figures illustrate embodiments of the invention and make it possible to understand the invention and all of the advantages thereof:

FIG. 1 is a meridian section through the mold of the invention;

FIG. 2 is a section perpendicular to the axis of rotation along the line II—II of FIG. 1;

FIG. 3 is a view in radial direction, as indicated by the arrow III in FIG. 2, exaggerating the shape which the mold in accordance with the invention can assume;

FIG. 4 is a view in the opposite radial direction, as indicated by the arrow IV in FIG. 2;

FIG. 5 illustrates a second embodiment of the invention;

FIG. 6 shows a holding ring used in the second embodiment; and

FIGS. 7 and 8 show a variant embodiment of the elements of slight thickness.

DETAILED DESCRIPTION OF THE INVENTION

In one embodiment of the invention, the peripheral molding ring of the tread is formed of a plurality of adjacent plates 1, disposed in such a manner that the movement of approach (molding) and of recoil (removal from mold) which takes place in the plane of the plate, is purely radial at every point of the tire. This movement is precisely radial, except for the thickness of the plates, this thickness corresponding to the resolution of the mold for defining the tread pattern. Steel plates, for instance, are employed; they are cut out as a function of the sculpture elements 5 which are to be made.

On the other hand, with the known technology, even in the case of sector molds, the movement for the stripping of the tread pattern cannot be perfectly radial; by observing the recoil movement of the sectors, it is noted that the mold removal is radial only at the level of the median plane of each sector. The mold removal is effected in a direction forming an angle, with respect to the radial direction, which becomes larger as one moves away in circumferential direction from said median position in order to reach the edges of the sectors. The maximum value of this angle corresponds to half of the angular development of the sector.

In order to form the peripheral molding ring, the plates 1 are arranged radially. Stated differently, when one examines the ring in section along a plane perpendicular to the axis of the mold, as in FIG. 2, the plates are so arranged as to comprise a radius, that is to say along an angle of 90° to employ the customary terminology for characterizing the trajectory of the cords in the tire. The elements can possibly be allowed to be disposed along an angle slightly different from 90°, for instance differing therefrom by about 10° to 15°.

Each plate is cut out in such a manner that its edge 10 assures the molding of the tread. All the customary elements of the tread patterns, including the blades, can be obtained in this way.

In accordance with one basic feature of the preferred embodiment of the invention, each of the adjacent elements constituting the ring rests on the two neighboring elements so that the bearing pressures tend continuously to push the elements back with respect to each other. It is seen that each element (in this case, each plate 1) is deformed so as to increase its size E in circumferential direction as compared with its thickness e, in stress-free condition. These deformations of the elements thus provide resilient interfaces between the elements.

FIG. 3 makes it possible clearly to understand the manner in which the plates 1 are deformed, for instance by bowing or dishing, by showing the shape of the peripheral ring, seen from the outside of the mold, in open position. Each element 1 has a thickness which is preferably between 1% and 5% of its length, measured parallel to the axis of the mold. Typically, for a tire mold for a passenger car, the thickness e of the plate used will vary from 0.1 mm to 5 mm. It is, in any event, much less than the size of the pitch of the tread pattern. Said deformations of the two adjacent elements are out of phase, so that the stacking of the elements on each other reaches a cumulative length L close or equal to the sum of the spaces E. One can also successively stack deformed elements with the interposition in each case of an undeformed element.

The deformations of two adjacent elements can be in direction opposite each other, as illustrated in FIG. 3, or be developed perpendicular to each other or in any other manner which has the result that the adjacent elements do not stick to each other over their entire surface.

All the plates 1 are threaded on a band 4 formed of a profiled member the ends of which can penetrate into each other to from a ring of freely variable diameter. This band serves merely a holding role and does not play a direct role in the kinematics of the closing and opening of the mold. This band must not introduce any rubbing which might cause tangential movements of the plates 1. The closing of the mold is caused by the movement of conical hoops 3, which are movable parallel to the axis of the mold. The angle which the conical surface forms is, of course, selected so as not exert a wedging action. The opening of the mold is permitted by the moving apart of the hoops 3 and is caused by the plates themselves, by being elastically brought towards a configuration such as illustrated in FIG. 3 while, in closed position, the plates all adjoin each other, at least on the inner side, as indicated diagrammatically in FIG. 4.

All the details of the design of the mold in accordance with this invention will become perfectly clear by the explanation of a special case of dimensioning, suitable for molding passenger car tires.

Let us assume a mold formed of 1500 plates. Each plate 1 is deformed and the deformation of the plates are disposed in opposition to each other as shown in FIG. 3, so that all of the plates remain in contact over an entire range of radial positions of the ring of plates 1.

Let us assume that the elastic play "j" is equal to at most 0.2 mm in open position. The play "j" is shown in FIG. 3.

The cumulation of all the plays is equal to 0.2 mm×1500 plates=300 mm, which makes it possible to absorb a variation in diameter of $$\frac{300 \text{ mm}}{\pi} \approx 100 \text{ mm}$$

diameter, namely 50 mm radius.

The difference between the closed position and the open position of the peripheral ring of such a mold, if one changes from a play of zero to a play of 0.2 mm between plates, therefore amounts to 50 mm in radius, which very easily permits the mold removal and the extraction of the tires.

In practice, one can achieve a sufficient play j simply as a result of defects in the planarity of the plates used, which has the result that it may even not be necessary to deform the plates, as explained. The defects in planarity are distributed at random over the surface of the plates. Their stacking without any special precaution can reproduce the functional play necessary for the elastic return towards the expanded position.

The tendency to the radial backward movement of the elements is therefore obtained automatically; the position which the mold of the invention naturally assumes, in the absence of any external stress coming from a force imparted by the hoops 3, is the open position, permitting the removal of the tire from the mold after vulcanization.

Let us also take the case of a specific stress upon molding on a rigid core; in this case, each plate penetrates into the rubber of the tread before being at the closed position (see detailed explanations of the specific problem in EP patent 242 840, cited above). This penetration takes place typically 7 mm before the end of the stroke for an ordinary tread pattern of a passenger car tire. One therefore has:

radial stroke: 7 mm cumulative peripheral play: 7 mm×2π≈45 mm play between plates:

$$\frac{45 \text{ mm}}{1500 \text{ plates}} \approx 0.03 \text{ mm}.$$

It is furthermore known that the physical and rheological characteristics of the rubber mixes used for treads are such that the rubber does not penetrate into a space of this size. It is therefore possible to mold on a rigid core without having to fear the occurrence of burrs on the tire, or even the impossibility of closing the mold due to the flow of the rubber under the effect of clamping of the rubber between the peripheral ring and the rigid core.

The transverse curvature of the tread of the tire can at times be rather great. The play between adjacent plates 1 can therefore be cancelled out on each side of the tread at the places marked 11 in FIG. 1, while play remains in the median part.

In this case, the condition of sufficiently slight play must also be present at the level of the median plane, and at the time when the plates come to penetrate into the rubber, that is to say well before the closed position of the mold. If, at this stage, it is noted that the play between plates is too great, it is necessary to increase the number of plates in order duly to decrease each play, and/or to use plates at least the molding edge 10 end of which is of progressively decreasing thickness so as to form a slight wedge. In this case, it is possible to have substantially the same play between plates along the entire molding edge 10.

If necessary, in order to take into account requirements for the production of the tread pattern, the plates can be conformed in such a manner as to leave a non-linear line in a view such as that of FIG. 4, for instance in order to follow the shape of certain blades. In this case, the plates are all conformed in the same manner and are stacked so as to place the conformations is phase, contrary to the deformations of the plates intended to cause an elastic recoil or to the defects in planarity, which are disposed in such a manner as to rest on each other, as explained above. This clearly illustrates that the conformation in question here responds to another function than the deformation or the defects in planarity having a specific role in the present invention.

The plates can also be disposed along an angle slightly different than 90° with respect to the median plane of the mold, the trace of which is seen in FIG. 4 (axis line). The invention can accommodate itself to a difference on the order to 10° to 15° with respect to the right angle. However, in no case can plates be disposed perpendicular to the axis of the mold or along a small angle with respect to the plane perpendicular to the axis of the mold, under the penalty otherwise of no longer having elastic recoil towards the expanded position. The plates must be disposed transversely, that is to say extend from one shoulder and be oriented towards the other shoulder of the tire to be molded.

In all cases concerning the production on the mold of the tread pattern motifs, it is also possible, as shown in FIGS. 7 and 8, to select the use of elements the thickness of which reaches a few millimeters and to cut out the tread patterns 5 along the exact molding angle, and no longer simply perpendicular to the plane of the element. The production of the elements then makes it necessary to use a more elaborate cutting technique, but the molded and vulcanized tread pattern will have a course which is far closer to the wishes of the designer of the tire, while in the case of cuts all perpendicular to the plane of the element, one can only approach the desired exact shape by a variation in ladder steps, with a resolution which is better the smaller the thickness of the elements used.

There has just been described a first variant embodiment in which each element extends transversely over the entire width of said ring, that is to say from one shoulder of the tire to the other. FIG. 5 illustrates another variant embodiment of the invention in which the peripheral ring has been divided into two parts G and D. This variant therefore comprises, transversely, two adjacent distinct elements 1D and 1G, each belonging to one of the parts and each having an edge 18 intended to come into contact on the other part with the corresponding edge 18 of the adjacent element of said other part.

This makes it possible to produce a mold commonly referred to as a mold "in two parts" which separate into two substantially identical axial halves upon an opening necessary for the mold removal.

This type of mold, which was current practice for molding diagonal tires was abandoned in favor of the so-called "sector" mold upon the change to radial tires, since it is preferable in this case to be able to move the sectors radially apart upon the mold removal.

However, the mold proposed by the present invention, in its two-part version, makes it possible to combine the greater simplicity of the two-part mold with the ability of opening by radial recoil of the elements which move radially away from the axis of the mold. In a preferred embodiment of the mold, it comprises means which make it possible to drive and control the movement of advance and recoil of the elements of one of the parts of the ring by means of a movement in axial direction of the adjacent shell 2.

There is assimilated here to "shell 2" both the molding part and the mechanical support on which it rests, which may also include the conical hoops 3, as shown in FIG. 5. It goes without saying, however, that this arrangement is not limitative and that these parts could, in certain cases, be mobile with respect to each other.

It is possible to obtain all the movements necessary for the molding and mold removal operations simply by acting in the axial direction on the shells. In FIG. 5, the right-hand part represents the open mold and the left-hand part represents the closed mold. The said means making it possible to drive and control the movement of the elements comprise a conical hoop 3 having a frustoconical surface 21 oriented radially to the inside, each element 1D or 1G resting on said frustoconical surface 21 by its radially upper edge 16.

Each shell 2 has a groove 20 in which the side end 13 of each element 1D or 1G is engaged. The radially upper surface 21 of said groove 20 is frustoconical, the lateral end 13 of each element 1D and 1G being cut out in accordance with a shape permitting each element 1D and 1G to rest on said frustoconical surface 21.

In the same way as in the first variant, the elements 1D rest on each other in circumferential direction and the part D of the ring therefore has a natural tendency to assume the expanded position, which is that shown on the right-hand part of FIG. 5. This is obtained as previously explained, either by the defects in planarity which each of the elements 1D naturally has and which are not the same for all the elements, or by deforming the elements and arranging them judiciously. The same applies with regard to the elements 1G.

The upper frustoconical surface 21 rests on the top 16 of each element 1G (or 1D). When the corresponding shell 2 is brought up axially, since all the elements 1G (or 1D) are resting in the axial direction on the adjacent ring of elements D (or G respectively) via their edges 18, the only possible movement of the elements 1G (or 1D), in response to the axial approach of the shell, is a movement of radial advance towards the closed position of the mold. The movement of all the elements 1G (or 1D) is, of course, simultaneous. This explains the closing of the mold. Preferably the movement of the left and right shells is symmetrical in order to avoid any rubbing of the edges 18 on each other.

From the closed position, if one moves the shells 2 axially apart, then, due to the natural tendency to increase in diameter, each of the parts G and D of the ring remains resting on the upper frustoconical surface 21. This explains the opening movement of the mold.

In accordance with one embodiment of the invention, each element has a notch 14, the notches 14 of the adjacent elements being aligned to form on each part of the ring a circumferential groove containing a holding ring 15 which is deformable in peripheral direction in order to accompany the movements of expansion and/or contraction in diameter of said ring. The role of this holding ring 15 is to aid in maintaining each of the elements 1D and 1G well aligned in their ring. FIG. 6 shows that the holding ring 15 is a split ring, each end 150 of which can slide on the other end in order freely to modify the development of the ring 15 without interrupting its continuity.

It is also seen that each element has two notches 19. In the manufacture of the mold, after the stacking of the elements 1D and 1G, the partial ring thus obtained can be held by inserting a non-deformable collar in the notches 19 in order to permit a straightening operation directed at obtaining a surface which is as perfectly frustoconical as possible for all the edges 16 (and, if necessary, also all of the edges 17) of the assembled elements 1D and 1G. For the proper operation of the mold of this invention it is desirable to obtain a coefficient of friction of the elements 1D and 1G on the frustoconical surfaces 21 and 22 which is as small as possible.

When such a mold is used with a rigid core molding the inner surface of the tire, it then preferably has a frustoconical surface 22, at the same angle as the frustoconical surface 21, oriented radially towards the outside, each element comprising an edge 17 which can come to rest on the said frustoconical surface 22. The lateral end 13 of element 1D and 1G is cut out in accordance with a shape corresponding to the meridian radial section of the groove 20. This makes it possible to obtain the piston effect between shell and ring, the role of which is described in EP patent 0 242 840.

Furthermore, each hoop 3 has a frustoconical surface 230, at the same angle as the frustoconical surface 22, also oriented radially towards the outside, each element comprising an edge 170 which is capable of resting on the said frustoconical surface 230. The resting of the elements on the frustoconical surfaces 230 and 22 assist in causing the movement of radial recoil of said elements upon the opening of the mold. They, or some of them, may, in fact, have a tendency to stick on the tire, to remain encrusted in the sculpturing of the tread. The tearing-away force can therefore come from the resting on the frustoconical surfaces 22 and 230 and then the natural tendency towards the opening of the ring brings the elements 1D and 1G against the frustoconical surface 21.

In order to limit the movement of radial recoil of the elements 1D (and 1G), a stop 23 is provided on each shell 2. This is a part attached to the hoops 3, at the axial end of the latter, which also has the surface 230 referred to above. This stop 23 stops the elements 1D and 1G by encountering the shoulder 12 present on all of them. It can be noted that the necessary movement of recoil corresponds only, in this embodiment, to the depth P (FIG. 8) of the sculpturing, plus a small additional safety increment. Thereupon, the left and right parts of the mold can slip away entirely freely by a purely axial movement. This considerably simplifies the vulcanization press which receives this type of mold and limits the space taken up by it in radial direction.

As already mentioned above, the invention also extends to a method of manufacturing a tire using a mold such as described and which may comprise a rigid core serving as support for the assembly of the components and then serving as element molding the inner cavity of the tire during the vulcanization. In all cases, one advantage of this method of molding is that it assures an excellent venting upon the molding.

The advantage of using this type of mold combined with a rigid core is that, in this case, it imparts to the mold a certain elasticity, that is to say a certain capacity to slightly increase the volume of the molding cavity in order to follow along in the expansion of the rubber resulting from the increase in temperature, while perfectly distributing the play between mold parts. This is obtained by allowing the shells 2, or more generally the conical hoops 3, to move back axially beyond a certain pressure prevailing in the tire molding cavity.

We claim:

1. A mold for molding the tread for a tire, comprising a plurality of adjacent elements of slight thickness, oriented substantially radially about an axis and arranged in a circumferential stack about the axis, substantially radially extending surfaces defined on each element which interface with the surfaces of adjacent elements when the elements are moved toward the axis, molding surfaces defined on the radially inner edges of the elements to mold the tread for a tire, and means controlling the movement of said elements towards said axis from an Open condition to a molding condition to reduce the diameter of the circumferential stack of elements and to bring the radial surfaces into compressed interfacing relation and the molding edges into side by side relation.

2. A mold according to claim 1, and including an elastic repulsion between the elements which, when the elements are compressed, urges said circumferential stack toward an increase in diameter.

3. A mold according to claim 1, in which the means for controlling the movement of the elements include at least one conical hoop.

4. A mold according to claim 1, in which each element is a metal plate.

5. A mold according to claim 1, in which each element has a thickness of between 0.1 mm and 5 mm.

6. A mold according to claim 1, in which each element has a thickness of between 1% and 5% of its length, measured parallel to the axis of the mold.

7. A mold according to claim 1, in which each element is deformed in such a manner as to present at least one deformation which, in stress-free condition, increases its size (E) in the circumferential direction as compared with its thickness (e), the deformation of two adjacent elements being out of phase.

8. A mold according to claim 7, in which the deformations of two adjacent elements are opposite each other.

9. A mold according to claim 1, in which the circumferential stack is divided into two parts and comprises transversely two adjacent distinct elements, each belonging to one of the parts, each having an edge intended to come into contact on the other part with a corresponding edge of the adjacent element of said other part.

10. A mold according to claim 9, including two shells for the molding of the outside of the sidewalls, means for driving and controlling movements of advance and recoil of the elements of one of the parts via a movement in axial direction of the adjacent shell.

11. A mold according to claim 10, in which the said means for driving and controlling the movements of the elements includes a conical hoop having a frustoconical surface oriented radially towards the inside, each element resting on said frustoconical surface via its radially upper edge.

12. A mold according to claim 11, in which the said means for driving and controlling the movements of the elements comprise at least one frustoconical surface, at the same angle, oriented radially towards the outside, each element having an edge capable of coming to rest on said frustoconical surface.

13. A mold according to claim 9, in which each element has one or more notches, the notches of the adjacent elements being aligned to form on each part of the circumferential stack circumferential grooves and including a holding ring accommodated in said grooves which holding ring is deformable in the peripheral direction in order to accommodate the movements of expansion and/or contraction in diameter of said ring.

14. A mold according to claim 1, including a rigid core for the molding of the inner surface of the tire.

15. A mold for molding the tread for a tire, comprising a plurality of adjacent elements of slight thickness arranged in their molding positions in a circumferential stack about an axis with each element of the stack oriented substantially radially with adjacent opposite faces of the elements being in resilient interfacing relation, means maintaining opposite faces of the elements of the stack in side by side compressed relation while molding the tread for a tire, and molding surfaces defined on the radially inner edges of the elements to mold the tread for a tire, the substantially radially extending resilient interfaces of the elements exerting a force which tends to expand the diameter of the stack and move the elements radially outwardly.

16. A tire tread mold comprising a circumferential stack of thin, radially extending deflectable plates having inner sculptured edges arranged as a ring about an axis, and which plates cooperate to mold the tire tread, and lateral surfaces which interface with the lateral surfaces of adjacent plates of the circumferential stack, the inner edges being adjacent during the molding operation; the lateral interfacing surfaces of the plates having a limited degree of circumferential play against each other to permit increase in the circumference of the ring of inner sculptured edges, and means for moving the plates radially from an open condition of the mold in which the stack is of large diameter to a closed molding condition in which the stack is compressed into a smaller diameter.

17. A tire mold as set forth in claim 16 in which the plates have outer sloped edges and including an outer axially movable restraining hoop engageable with the outer sloped edges to hold the plates in molding position and to release the plates for outward displacement away from the molded tread after the molding operation.

18. A mold according to claim 16, in which each plate has a thickness of between 1% and 5% of its length, measured parallel to the axis of the mold.

19. A mold according to claim 16, in which the ring is divided into two parts and the ring comprises transversely two adjacent distinct plates, each belonging to one of the parts, each having an edge intended to come into contact on the other part with a corresponding edge of the adjacent plate of said other part.

20. A mold according to claim 16, comprising two shells for the molding of the outside of the sidewalls, and in which the moving means includes means for driving and controlling movements of advance and recoil of the plates of one of the parts of the ring via a movement in axial direction of the adjacent shell.

21. A mold according to claim 20, in which the said means for driving and controlling the movements of the elements includes a conical hoop having a frustoconical surface oriented radially towards the inside, each element resting on said frustoconical surface via its radially upper edge.

22. A method for molding the tread for a tire, comprising arranging in a circumferential stack about an axis a plurality of adjacent elements of slight thickness having molding surfaces defined on the inner edges of the elements to mold the tread for a tire, the elements being oriented substantially radially about an axis with their opposite faces extending substantially radially, and moving said elements radially from an open condition of the mold in which the stack has a larger diameter to a closed position in which the stack has a smaller diameter and the elements are compressed in resilient interfacing relation and said molding edges are brought into side by side relation.

23. A method of molding a tire tread comprising arranging a circumferential stack of thin, radially extending deflectable plates around an axis, the plates having inner sculptured edges which cooperate to mold a tire tread, lateral surfaces which interface with the lateral surfaces of adjacent plates of the circumferential stack, and outer edges, the lateral interfacing surfaces of the plates having a limited degree of circumferential play against each other, applying a force against the radially outer edges of the plates to displace the plates radially from an open condition of the mold to a closed condition, compressing the plates so that the inner edges are moved adjacent each other during the molding operation, and removing the force after molding to relax the compressive force so that the circumferential play will displace the plates away from the molded tire and increase the circumference of the inner sculpturing edges after the molding operation.

24. A method of manufacturing a tire according to claim 23, including progressively assembling the tire on a rigid core serving as support for the assembling of the components and then serving to mold the inner cavity of the tire during the vulcanization.

25. A tire mold comprising a peripheral ring for molding the outside of the tread, said ring comprising a plurality of adjacent elements of slight thickness arranged in a circumferential stack about an axis of the mold, each element oriented substantially radially to the axis of the mold and having an inner molding edge extending transversely across at least a part of the distance between the axial ends of the peripheral ring, the circumferential stack in molding position being compressed with opposite surfaces of the elements in the molding position being in interfacing relationship and with the molding edges in closed side by side relationship.

26. A tire mold as set forth in claim 25 including two shells for molding the side walls of the tire and in which the transversely extending molding edges extend at least part way between the two shells.

27. A mold as set forth in claim 25, including means maintaining the elements in compressed relationship with the interfaces exerting a force which tends to expand the diameter of the stack and move the elements outwardly away from the molded tread.

\* \* \* \* \*